United States Patent
Rodatz et al.

(10) Patent No.: US 11,578,636 B2
(45) Date of Patent: Feb. 14, 2023

(54) METHOD FOR DETERMINING THE OXYGEN LOAD OF A CATALYTIC CONVERTER OF AN INTERNAL COMBUSTION ENGINE, AND EXHAUST SYSTEM OF AN INTERNAL COMBUSTION ENGINE

(71) Applicant: Vitesco Technologies GmbH, Hannover (DE)

(72) Inventors: Paul Rodatz, Munich (DE); Gerhard Haft, Munich (DE); Hong Zhang, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/603,768

(22) PCT Filed: Apr. 16, 2020

(86) PCT No.: PCT/EP2020/060657
§ 371 (c)(1),
(2) Date: Oct. 14, 2021

(87) PCT Pub. No.: WO2020/212468
PCT Pub. Date: Oct. 22, 2020

(65) Prior Publication Data
US 2022/0178295 A1     Jun. 9, 2022

(30) Foreign Application Priority Data

Apr. 17, 2019   (DE) .................... 10 2019 205 551.6

(51) Int. Cl.
*F01N 11/00*    (2006.01)
*F02D 41/02*    (2006.01)
*F01N 9/00*     (2006.01)

(52) U.S. Cl.
CPC ........ *F01N 11/007* (2013.01); *F02D 41/0295* (2013.01); *F01N 9/007* (2013.01);
(Continued)

(58) Field of Classification Search
CPC combination set(s) only.
See application file for complete search history.

(56) References Cited

U.S. PATENT DOCUMENTS

| | | |
|---|---|---|
| 6,301,878 B1 | 10/2001 | Zhang .............................. 60/274 |
| 2003/0010016 A1 | 1/2003 | Beer ................................ 60/274 |

(Continued)

FOREIGN PATENT DOCUMENTS

| | | | |
|---|---|---|---|
| DE | 198 52 244 | 12/1999 | ............. F02D 41/14 |
| DE | 103 32 057 | 2/2005 | ............. F01N 11/00 |

(Continued)

OTHER PUBLICATIONS

Search Report for International Application No. PCT/EP2020/060657, 12 pages, dated May 29, 2020.
(Continued)

*Primary Examiner* — Binh Q Tran
(74) *Attorney, Agent, or Firm* — Slayden Grubert Beard PLLC

(57) ABSTRACT

Various embodiments include a method of ascertaining the oxygen load of a catalytic converter disposed in an exhaust tract of an internal combustion engine with an exhaust gas sensor is disposed downstream of the catalytic converter comprising: generating a signal using the exhaust gas sensor indicating a proportion of nitrogen oxide and/or ammonia in the exhaust gas; and ascertaining the oxygen load of the catalytic converter at least partly on the basis of the signal from the exhaust gas sensor.

7 Claims, 2 Drawing Sheets

(52) U.S. Cl.
CPC .... *F01N 2560/025* (2013.01); *F01N 2570/16* (2013.01); *F01N 2900/0416* (2013.01); *F01N 2900/1624* (2013.01); *F02D 2200/0814* (2013.01)

(56) References Cited

U.S. PATENT DOCUMENTS

| | | | |
|---|---|---|---|
| 2003/0167754 A1* | 9/2003 | Schnaibel | F01N 3/0842 60/285 |
| 2005/0022508 A1 | 2/2005 | Rosel | 60/277 |
| 2006/0032216 A1 | 2/2006 | Odendall | 60/285 |
| 2009/0199543 A1* | 8/2009 | Sawada | F01N 13/011 60/299 |
| 2010/0043402 A1 | 2/2010 | Perry | 60/285 |
| 2010/0205938 A1* | 8/2010 | Ding | F02D 41/146 60/276 |
| 2016/0186628 A1* | 6/2016 | Saitoh | F01N 3/2066 60/276 |
| 2016/0356196 A1* | 12/2016 | Nakano | F01N 9/00 |
| 2018/0113103 A1* | 4/2018 | Okamoto | G01N 27/4074 |
| 2018/0216512 A1* | 8/2018 | Srinivasan | F01N 3/0814 |

FOREIGN PATENT DOCUMENTS

| | | | | |
|---|---|---|---|---|
| DE | 10 2004 038 481 | | 7/2005 | ............. F02D 41/14 |
| DE | 10 2009 054 046 | | 9/2010 | ............. F01N 9/00 |
| EP | 2 599 985 | | 6/2013 | ............. F02D 41/14 |
| EP | 2 765 292 | | 8/2014 | ............. F02D 41/14 |
| WO | 01 34960 | | 5/2001 | ............. F02D 35/00 |

OTHER PUBLICATIONS

Office Action for DE Application No. 10 2019 205 551.6, 7 pages, dated Mar. 27, 2020.

\* cited by examiner

METHOD FOR DETERMINING THE OXYGEN LOAD OF A CATALYTIC CONVERTER OF AN INTERNAL COMBUSTION ENGINE, AND EXHAUST SYSTEM OF AN INTERNAL COMBUSTION ENGINE

CROSS-REFERENCE TO RELATED APPLICATIONS

This application is a U.S. National Stage Application of International Application No. PCT/EP2020/060657 filed Apr. 16, 2020, which designates the United States of America, and claims priority to DE Application No. 10 2019 205 551.6 filed Apr. 17, 2019, the contents of which are hereby incorporated by reference in their entirety.

TECHNICAL FIELD

The present disclosure relates to internal combustion engines. Various embodiments include methods of ascertaining the oxygen load of a catalytic converter, especially a three-way catalytic converter, and/o exhaust tracts of an internal combustion engine.

BACKGROUND

Catalytic converters are used for exhaust gas aftertreatment in motor vehicles to convert air pollutants and avoid emitting them into the environment. Exhaust gas aftertreatment by a three-way catalytic converter converts carbon monoxide (CO), nitrogen oxides (NOx), and uncombusted hydrocarbons (HC) to carbon dioxide (CO2), nitrogen (N2), and water (H2O).

The air-fuel mixture for an internal combustion engine is controlled by means of a cascaded closed-loop control system consisting of an inner control loop that controls the lambda value upstream of a catalytic converter, and an outer control loop that controls the lambda value downstream of the catalytic converter. More particularly, the catalytic converter is kept within the optimal conversion window. For this purpose, it is desirable to control the oxygen load of the catalytic converter, especially of the three-way catalytic converter, in such a way that the catalytic converter is saturated/loaded with about 50% oxygen. This can ensure sufficient reliability against any perturbations of the system in the lean or rich direction.

The load state of the catalytic converter can be estimated by means of a lambda probe disposed downstream of the catalytic converter, but this estimate is sufficiently accurate only in the case of loads of less than 10% or greater than 90%.

SUMMARY

The teachings of the present disclosure describe systems and/or methods to ascertain the load state of a catalytic converter disposed in an exhaust tract of an internal combustion engine reliably and with maximum accuracy, and to provide an exhaust tract with a catalytic converter, the oxygen load of which can be ascertained. For example, some embodiments of the teachings herein include a method of ascertaining the oxygen load of a catalytic converter (100) disposed in an exhaust tract (10) of an internal combustion engine, wherein an exhaust gas sensor (110) is disposed downstream of the catalytic converter (100), wherein the method comprises: generating at least one signal by means of the exhaust gas sensor (110) that indicates the proportion of nitrogen oxide and/or ammonia in the exhaust gas, and ascertaining the oxygen load of the catalytic converter (100) at least partly on the basis of the at least one signal from the exhaust gas sensor (110).

In some embodiments, the methods further include ascertaining at least one gradient in the at least one signal from the exhaust gas sensor (110), wherein the oxygen load of the catalytic converter (100) is ascertained on the basis of the at least one ascertained gradient in the at least one signal from the exhaust gas sensor (110).

In some embodiments, the method further includes ascertaining a progression in at least one gradient in the at least one signal from the exhaust gas sensor (110), and switching the internal combustion engine to operation with a lean air-fuel mixture when the ascertained progression of the at least one gradient in the at least one signal from the exhaust gas sensor (110) is at least partly flattening.

In some embodiments, the method further comprises switching the internal combustion engine to operation with a rich air-fuel mixture when the ascertained oxygen load exceeds a predetermined load threshold.

In some embodiments, the predetermined load threshold is about 80%, about 70%, about 60%, and/or 55%, of the maximum oxygen storage capacity of the catalytic converter.

In some embodiments, the predetermined load threshold is selected depending on the current operating parameters of the internal combustion engine and/or the catalytic converter (100).

In some embodiments, the method further comprises: ascertaining a progression against time in the at least one signal from the exhaust gas sensor (110), and switching the internal combustion engine to operation with a rich air-fuel mixture when the ascertained progression against time in the at least one signal from the exhaust gas sensor (110) reaches a minimum.

In some embodiments, the at least one signal from the exhaust gas sensor (110) is generated after switching the internal combustion engine from operation with a rich air-fuel mixture to operation with a lean air-fuel mixture.

As another example, some embodiments include an exhaust tract (10) for an internal combustion engine, comprising: a catalytic converter (100) for aftertreatment of the exhaust gas from the internal combustion engine, an exhaust gas sensor (110) disposed downstream of the catalytic converter (100) and designed to generate a signal that indicates the proportion of nitrogen oxide and/or ammonia in the exhaust gas, and a control unit (120) that receives the signals from the exhaust gas sensor (110) and is designed to execute a process as claimed in any of the preceding claims.

As another example, some embodiments include an internal combustion engine for a vehicle, comprising an exhaust tract (10) as described herein.

BRIEF DESCRIPTION OF THE DRAWINGS

Further objects and features of the present invention will become apparent to a person skilled in the art by putting the present teaching into practice and taking into consideration the accompanying drawings, in which.

DETAILED DESCRIPTION

Figure 1:
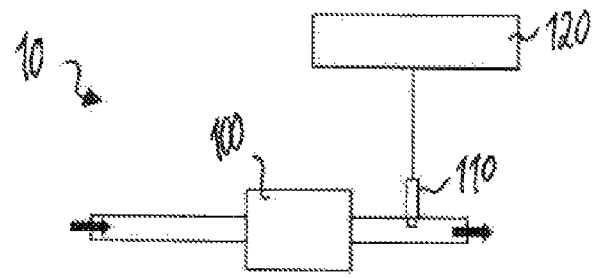
FIG. 1 shows an exhaust tract of an internal combustion engine with catalytic converter and exhaust gas sensor incorporating teachings of the present disclosure.

The present disclosure describes methods and systems useful for ascertaining the oxygen load of a catalytic converter, e.g. a three-way catalytic converter, using the signals from an exhaust gas sensor disposed downstream of the catalytic converter, designed to indicate the proportion of nitrogen oxide and/or ammonia in the exhaust gas or the nitrogen oxide and/or ammonia concentration in the exhaust gas. More particularly, this exploits the production of ammonia when a low-oxygen exhaust gas is present in a three-way catalytic converter. If the three-way catalytic converter is charged with an exhaust gas that produces when the internal combustion engine is operated with a rich air-fuel mixture, the oxygen stored in the catalytic converter can be consumed first, after which ammonia production rises again.

As the air-fuel mixture becomes lean, ammonia production continues and the oxygen load of the catalytic converter rises again. With increasing duration of operation of the internal combustion engine with a lean air-fuel mixture, the catalytic converter fills up with oxygen and ammonia production decreases steadily. At a high oxygen load of the catalytic converter, it is no longer possible to convert the nitrogen oxide therein either, and the result is a nitrogen oxide slip, meaning that the nitrogen oxide is no longer converted within the catalytic converter and hence exits untreated from the catalytic converter.

The signal from the exhaust gas sensor may indicate the sum total of the proportions of nitrogen oxide and ammonia in the exhaust gas. Therefore, during a period of operation of the internal combustion engine with a rich air-fuel mixture, the signal from the exhaust gas sensor rises on account of ammonia production, and, in a subsequent phase of operation of the internal combustion engine with a lean air-fuel mixture, the signal from the exhaust gas sensor drops again with decreasing ammonia production. At a particular juncture during the phase of operation of the internal combustion engine with a lean air-fuel mixture, the signal from the ammonia sensor reaches a minimum and then rises again on account of the abovementioned nitrogen oxide slip.

As long as the nitrogen oxide signal is dropping, the area of the catalytic converter still unladen with oxygen is still sufficiently large to prevent nitrogen oxide slip. In order to keep nitrogen oxide emissions as low as possible, the method may include enriching the air-fuel mixture again for operation of the internal combustion engine before nitrogen oxides slip commences. In some embodiments, the signal from the exhaust gas sensor is utilized in order to ascertain the oxygen load of the catalytic converter and to control the internal combustion engine in such a way that the oxygen load of the catalytic converter is within a desired region, for example around 50%.

Some embodiments include a method of ascertaining the oxygen load of a catalytic converter, e.g. a three-way catalytic converter, disposed in an exhaust tract of an internal combustion engine. The exhaust gas sensor is disposed downstream of the catalytic converter. The method includes generating at least one signal by means of the exhaust gas sensor that indicates the proportion of nitrogen oxide and/or ammonia in the exhaust gas and ascertaining the oxygen load of the catalytic converter at least partly on the basis of the at least one signal from the exhaust gas sensor.

In some embodiments, the exhaust gas sensor may be a nitrogen oxide sensor that indicates the sum total of the proportions of nitrogen oxide and ammonia in the exhaust gas, or an ammonia sensor that indicates the proportion of ammonia in the exhaust gas. It is thus possible to ascertain the oxygen load of the catalytic converter, e.g. a three-way catalytic converter, in a simple manner with the aid of an exhaust gas sensor disposed downstream of the catalytic converter, which is usually already present in any case, and hence to control the operation of the internal combustion engine in an optimized manner.

In some embodiments, the method further includes ascertaining at least one gradient in the at least one signal from the exhaust gas sensor. In some embodiments, the oxygen load of the catalytic converter is ascertained on the basis of the at least one ascertained gradient in the at least one signal from the exhaust gas sensor.

In some embodiments, the method may include ascertaining a progression of the at least one gradient in the at least one signal from the exhaust gas sensor, and switching the internal combustion engine to operation with a lean air-fuel mixture when the ascertained progression of the at least one gradient in the at least one signal from the exhaust gas sensor is at least partly decreasing or flattening. More particularly, the gradient is predominantly negative and becomes less negative.

In some embodiments, the method further comprises switching the internal combustion engine to operation with a rich air-fuel mixture when the oxygen load ascertained exceeds a predetermined load threshold. It is thus possible to achieve the effect that, when the predetermined load threshold is exceeded, the oxygen stored in the catalytic converter reacts with the exhaust gas and hence the oxygen load of the catalytic converter falls back into the desired range.

In some embodiments, the predetermined load threshold is about 80%, about 70%, about 60%, and/or about 55%, of the maximum oxygen storage capacity of the catalytic converter.

In some embodiments, the predetermined load threshold may be selected depending on the current operating parameters of the internal combustion engine and/or the catalytic converter, for example the exhaust gas temperature, the catalytic converter temperature, the exhaust gas mass flow rate or the air-fuel mixture upstream of the catalytic converter.

In some embodiments, the method further comprises ascertaining a progression against time in the at least one signal from the exhaust gas sensor and switching the internal combustion engine to operation with a rich air-fuel mixture when the ascertained progression against time in the at least one signal from the exhaust gas sensor reaches a minimum. The minimum can, as already mentioned above, be an indication that there will be a nitrogen oxide slip thereafter, which should preferably be avoided.

In some embodiments, the signal from the exhaust gas sensor may indicate the sum total of the proportions of nitrogen oxide and ammonia in the exhaust gas. Therefore, the signal from the exhaust gas sensor rises during a phase of operation of the internal combustion engine with a rich air-fuel mixture on account of the ammonia production, and this signal, in subsequent operation of the internal combustion engine with a lean-fuel mixture, declines with decreasing ammonia production and ultimately reaches its minimum, and then rises again on account of the nitrogen oxide slip that then exists. For that reason, it may be preferable, on attainment of this minimum, to provide for switching of the internal combustion engine to operation with a rich air-fuel mixture in order to very substantially avoid nitrogen oxide slip.

In some embodiments, the oxygen load of the catalytic converter is ascertained using that signal from the exhaust gas sensor that is generated after switching the internal combustion engine from operation with a rich air-fuel mixture to operation with a lean air-fuel mixture. After the switchover, ammonia production does not drop abruptly since the oxygen in the exhaust gas is preferentially stored in the catalytic converter and does not oxidize the ammonia or any of the precursors of ammonia formation. With increasing oxygen storage in the catalytic converter, more oxygen is available for the oxidation, and ammonia formation declines. As a result, the ammonia concentration downstream of the catalytic converter correlates with the amount of oxygen stored.

In some embodiments, an exhaust tract for an internal combustion engine comprises a catalytic converter for aftertreatment of the exhaust gas from the internal combustion engine, an exhaust gas sensor disposed downstream of the catalytic converter and designed to generate a signal that indicates the proportion of nitrogen oxide and/or ammonia in the exhaust gas, and a control unit that receives the signals from the exhaust gas sensor and is designed to execute a process as claimed in any of the preceding claims.

In some embodiments, an internal combustion for a vehicle includes an exhaust tract as described herein.

In the context of the present disclosure, the term "oxygen load" describes the degree of loading of a catalytic converter, especially three-way catalytic converter, with oxygen. More particularly, this means the relative percentage load of the catalytic converter with regard to its maximum storage capacity of oxygen, where the catalytic converter, over and above a load state of around 90%, is able to absorb less and less oxygen, and some of the oxygen flows through the catalytic converter without being stored therein. Over and above a load state of 100%, the catalytic converter cannot absorb any more oxygen, and so oxygen penetrating into the catalytic converter again flows through the catalytic converter without being stored therein.

FIG. 1 shows an illustrative catalytic converter 100 that can be used in an exhaust tract 10 of an internal combustion engine, e.g. a gasoline engine, in order to convert air pollutants in the exhaust gas. The catalytic converter 100 may be a three-way catalytic converter for conversion of carbon monoxide (CO), nitrogen oxides (NOx) and uncombusted hydrocarbons (HC) to carbon dioxide (CO2), nitrogen (N2) and water (H2O). It will be evident to the person skilled in the art that further units and devices may be present in the exhaust tract, for example a particulate filter or a silencer.

Downstream of the catalytic converter 100 is disposed an exhaust gas sensor 110 designed to ascertain the proportion of nitrogen oxide and/or ammonia in the exhaust gas downstream of the catalytic converter 100. The exhaust gas sensor 110, which is sensitive to nitrogen oxide and/or ammonia, is, for example, a mixed potential sensor with a mixed potential electrode and/or a reference electrode. For example, the exhaust gas sensor 110 is a nitrogen oxide sensor which is cross-sensitive for ammonia. Alternatively, the exhaust gas sensor 110 is an ammonia sensor that can indicate the proportion of ammonia in the exhaust gas.

Also assigned to the internal combustion engine is a control unit 120 which is in communication with the exhaust gas sensor 110 and is designed to detect the signals therefrom, evaluate them and control the operation of the internal combustion engine. For instance, the control unit 120 is designed to receive the sensor signal transmitted by the exhaust gas sensor 110 that indicates a proportion of nitrogen oxide and ammonia in the exhaust gas downstream of the catalytic converter 100, and to use it to ascertain the oxygen load of the catalytic converter 100, which will be elucidated in detail hereinafter. This assignment is effected, for example, via a reference table provided in the control unit 120 that assigns a corresponding oxygen load to every nitrogen oxide and ammonia concentration.

In some embodiments, it is possible to record a mathematical map or a diagram (see also FIG. 2) in the control unit 120 that establishes a correlation between the nitrogen oxide and ammonia concentration downstream of the catalytic converter 100 and the oxygen load of the catalytic converter 100. It may be preferable here that the mathematical map also takes account of at least one further parameter of the exhaust gas including, for example, the temperature of the exhaust gas, the temperature of the catalytic converter and/or the exhaust gas mass flow rate.

Figure 2:
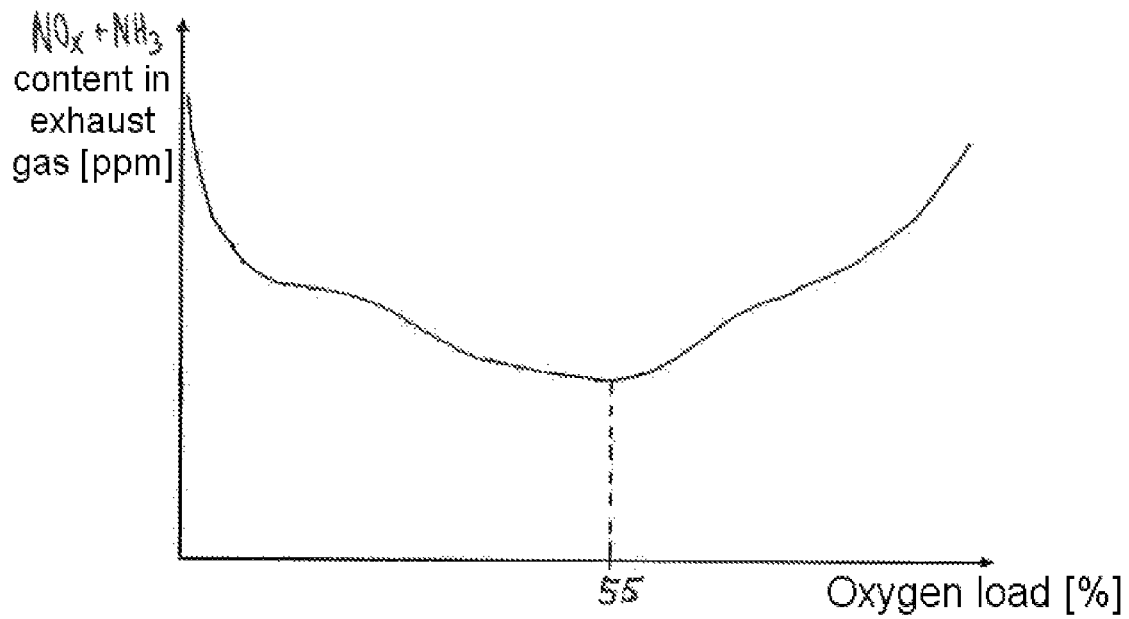
FIG. 2 shows a diagram that illustrates the correlation between the signal from the exhaust gas sensor and the FIG. 3 illustrates a flow diagram of an illustrative configuration of a method for ascertaining the oxygen load of a catalytic converter incorporating teachings of the present disclosure.

FIG. 2 shows an illustrative diagram that illustrates a correlation between the signal from the exhaust gas sensor 110 and the oxygen load of the catalytic converter 100. Plotted on the abscissa is the oxygen load (in [%]), and on the ordinate the signal from the exhaust gas sensor 100 that indicates the sum total of the proportions of nitrogen oxide and ammonia (in [ppm], ppm=parts per million). It is apparent from FIG. 2 that the oxygen load can be read off by means of the signal from the exhaust gas sensor 100. More particularly, FIG. 2 shows that the signal from the exhaust gas sensor 110 has a minimum at a juncture from which there is again nitrogen oxide slip through the catalytic converter 100. In the illustrative diagram of FIG. 2, this minimum is at about 55% of the oxygen load of the catalytic converter 100, which simultaneously indicates an optimal oxygen load of the catalytic converter 100.

Figure 3:
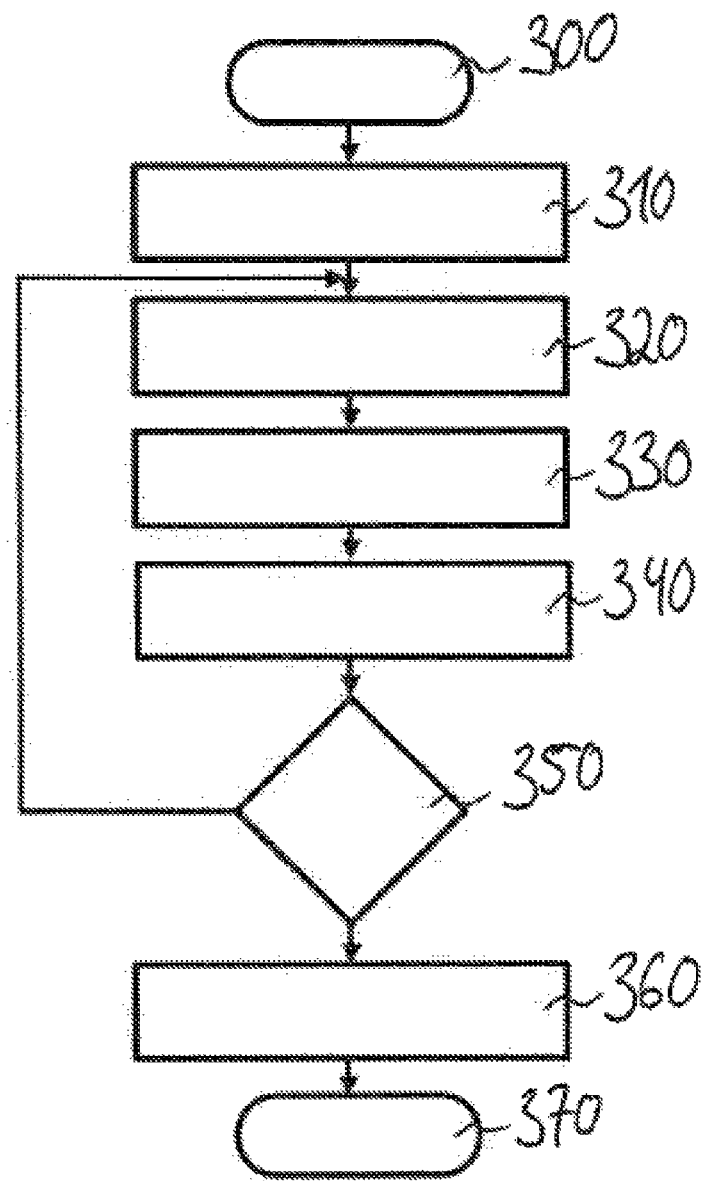

Referring to FIG. 3, an illustrative flow diagram of a method incorporating teachings of the present disclosure for ascertaining the oxygen load of the catalytic converter 100 of FIG. 1 is shown. The method of FIG. 3 commences in step 300 and then goes on to step 310, where the internal combustion engine is being operated with a rich air-fuel mixture.

In a further step 320, the operation of the internal combustion engine with a rich air-fuel mixture is switched to operation with a lean air-fuel mixture.

In a subsequent step 330, the exhaust gas sensor 110 generates a signal that indicates the proportion of nitrogen oxide and ammonia in the exhaust gas. The exhaust gas sensor 110 can transmit this signal to the control unit 120.

In a subsequent step 340, the control unit 120, on the basis of the signal from the exhaust gas sensor 110 generated in step 330, ascertains the oxygen load of the catalytic converter 100. For this purpose, for example, the diagram of FIG. 2 may be consulted. In some embodiments, a reference table or a mathematical map may be recorded in the control unit, each of which gives a correlation of the proportion of nitrogen oxide and ammonia in the exhaust gas downstream of the catalytic converter 100 and the oxygen load of the catalytic converter 100.

In a subsequent step 350, an enquiry is made as to whether the ascertained oxygen load of the catalytic converter 100 exceeds a predetermined load threshold, for example 55%. If it is found in step 350 that the ascertained oxygen load of the catalytic converter does not exceed the predetermined load threshold, the method goes back to step 320, and operation of the internal combustion engine with a lean air-fuel mixture is continued.

If, however, it is determined in step 350 that the ascertained oxygen load of the catalytic converter 100 exceeds the predetermined load threshold, the method goes to step 360, where there is a changeover in the internal combustion engine from operation with a lean air-fuel mixture back to operation with a rich-fuel mixture, before the method ends in step 370. The changeover allows the oxygen stored in the catalytic converter 100 to be utilized again for conversion of the air pollutants, especially of uncombusted hydrocarbons and carbon monoxide, as a result of which the oxygen load in the catalytic converter 100 decreases again and drops into the desired load range.

In some embodiments, is possible to avoid an overload of a catalytic converter with oxygen and an associated increase in nitrogen oxide emission.

What is claimed is:

1. A method of operating an internal combustion engine with a catalytic converter disposed in an exhaust tract of the internal combustion engine with an exhaust gas sensor disposed downstream of the catalytic converter, the method comprising:
   generating a signal using the exhaust gas sensor indicating a proportion of nitrogen oxide and/or ammonia in the exhaust gas;
   ascertaining the oxygen load of the catalytic converter at least partly on the basis of the signal from the exhaust gas sensor; and
   switching the internal combustion engine to operation with a rich air-fuel mixture when the ascertained oxygen load exceeds a predetermined load threshold;
   wherein the predetermined load threshold is 55% of the oxygen storage capacity of the catalytic converter.

2. The method as claimed in claim 1, further comprising ascertaining a gradient in the signal from the exhaust gas sensor;
   wherein ascertaining the oxygen load of the catalytic converter is based on the gradient in the signal from the exhaust gas sensor.

3. The method as claimed in claim 2, further comprising:
   ascertaining a progression in the gradient in the signal from the exhaust gas sensor; and
   switching the internal combustion engine to operation with a lean air-fuel mixture when the ascertained progression of the gradient in the signal from the exhaust gas sensor is at least partly flattening.

4. The method as claimed in claim 1, further comprising:
   ascertaining a progression against time in the signal from the exhaust gas sensor; and
   switching the internal combustion engine to operation with a rich air-fuel mixture when the ascertained progression against time in the signal from the exhaust gas sensor reaches a minimum.

5. The method as claimed in claim 1, wherein the signal from the exhaust gas sensor is generated after switching the internal combustion engine from operation with a rich air-fuel mixture to operation with a lean air-fuel mixture.

6. An exhaust tract for an internal combustion engine, the exhaust tract comprising:
   a catalytic converter for aftertreatment of an exhaust gas from the internal combustion engine;
   an exhaust gas sensor disposed downstream of the catalytic converter generating a signal indicating a proportion of nitrogen oxide and/or ammonia in the exhaust gas; and
   a control unit receiving the signal from the exhaust gas sensor;
   wherein the control unit is programmed to:
      generate a signal using the exhaust gas sensor indicating a proportion of nitrogen oxide and/or ammonia in the exhaust gas;
      ascertain the oxygen load of the catalytic converter at least partly on the basis of the signal from the exhaust gas sensor; and
      switch the internal combustion engine to operation with a rich air-fuel mixture when the ascertained oxygen load exceeds a predetermined load threshold;
      wherein the predetermined load threshold is 55% of the oxygen storage capacity of the catalytic converter.

7. An internal combustion engine for a vehicle, comprising:
   a cylinder for combustion of a fuel;
   an exhaust tract leading an exhaust gas from the cylinder;
   a catalytic converter for aftertreatment of the exhaust gas;
   an exhaust gas sensor disposed downstream of the catalytic converter generating a signal indicating a proportion of nitrogen oxide and/or ammonia in the exhaust gas; and
   a control unit receiving the signal from the exhaust gas sensor;
   wherein the control unit is programmed to:
      generate a signal using the exhaust gas sensor indicating a proportion of nitrogen oxide and/or ammonia in the exhaust gas;
      ascertain the oxygen load of the catalytic converter at least partly on the basis of the signal from the exhaust gas sensor; and
      switch the internal combustion engine to operation with a rich air-fuel mixture when the ascertained oxygen load exceeds a predetermined load threshold;
      wherein the predetermined load threshold is 55% of the oxygen storage capacity of the catalytic converter.

* * * * *